US012472995B2

(12) United States Patent
Rasekhi

(10) Patent No.: US 12,472,995 B2
(45) Date of Patent: Nov. 18, 2025

(54) ACTIVE SEALING/LOCKING USING THE CONSTRICTION PRINCIPLE

(71) Applicant: BODE—DIE TÜR GMBH, Kassel (DE)

(72) Inventor: Diako Rasekhi, Kassel (DE)

(73) Assignee: BODE—DIE TÜR GMBH, Kassel (DE)

(*) Notice: Subject to any disclaimer, the term of this patent is extended or adjusted under 35 U.S.C. 154(b) by 22 days.

(21) Appl. No.: 18/569,511

(22) PCT Filed: Jun. 21, 2022

(86) PCT No.: PCT/EP2022/066848

§ 371 (c)(1),
(2) Date: Dec. 12, 2023

(87) PCT Pub. No.: WO2022/268791

PCT Pub. Date: Dec. 29, 2022

(65) Prior Publication Data

US 2024/0217563 A1 Jul. 4, 2024

(30) Foreign Application Priority Data

Jun. 23, 2021 (DE) ..................... 20 2021 103 364.9

(51) Int. Cl.
*B61D 19/00* (2006.01)
*E06B 7/18* (2006.01)

(52) U.S. Cl.
CPC .............. *B61D 19/009* (2013.01); *E06B 7/18* (2013.01)

(58) Field of Classification Search
None
See application file for complete search history.

(56) References Cited

U.S. PATENT DOCUMENTS 908,183 A * 12/1908 Wilson ...................... E06B 7/18 49/320
1,045,869 A * 12/1912 McFarland ............... E06B 7/18 49/317

(Continued)

FOREIGN PATENT DOCUMENTS

CH 471707 A * 4/1969
CN 111456598 A * 7/2020

(Continued)

OTHER PUBLICATIONS

International Search Report for International Application No. PCT/EP2022/066848, dated Nov. 29, 2022, 2 pages.

(Continued)

*Primary Examiner* — Catherine A Kelly
(74) *Attorney, Agent, or Firm* — CANTOR COLBURN LLP

(57) ABSTRACT

A sealing system for an opening in a wall surface includes a wall surface with an opening, having a circumferential inner surface, a leaf adapted to the geometry of the opening to be inserted into the opening and closed, wherein a circumferential outer surface of the leaf is arranged facing the inner surface of the opening in the closed state.

A sealing device is formed by a first sealing element arranged in the inner surface and moved towards and away from the outer surface.

The system includes a drive element that drives the first sealing element in the opening plane towards the outer surface of the leaf into a sealing position and produces a force in the direction of the outer surface such that when the opening is in the (Continued)

A-A

B-B closed state, the first sealing element comes into sealing contact with the outer surface when acted upon by force.

11 Claims, 3 Drawing Sheets

(56) References Cited

U.S. PATENT DOCUMENTS

| | | | | | |
|---|---|---|---|---|---|
| 1,178,775 | A * | 4/1916 | Albright | E06B 7/18 49/318 |
| 1,197,955 | A * | 9/1916 | Ross | E06B 7/18 49/316 |
| 1,723,305 | A * | 8/1929 | Sipe | E05C 19/002 16/86 A |
| 2,195,875 | A * | 4/1940 | Pixley | E05F 3/02 49/206 |
| 2,207,065 | A * | 7/1940 | Mccormick | E06B 3/50 49/318 |
| 2,248,719 | A * | 7/1941 | Owen | E06B 7/18 49/303 |
| 2,765,504 | A * | 10/1956 | Laumann | E06B 7/18 49/319 |
| 3,388,502 | A * | 6/1968 | Ceyer | E06B 7/2318 49/498.1 |
| 4,109,416 | A * | 8/1978 | Newson | B61D 19/005 49/316 |
| 4,128,967 | A * | 12/1978 | Kirsch | E06B 7/18 49/318 |
| 4,141,179 | A * | 2/1979 | Newson | E06B 7/18 49/316 |
| 4,656,779 | A * | 4/1987 | Fedeli | E05C 19/001 49/318 |
| 5,347,757 | A * | 9/1994 | Losito | B61D 19/009 49/210 |
| 8,109,037 | B2 * | 2/2012 | Speyer | E06B 7/16 49/318 |
| 8,191,314 | B2 * | 6/2012 | Grimaldi | B63B 19/00 49/318 |
| 8,468,746 | B2 * | 6/2013 | Salerno | E06B 7/18 49/316 |

FOREIGN PATENT DOCUMENTS

| | | | | |
|---|---|---|---|---|
| DE | 102014217343 | A1 | 3/2016 | |
| DE | 202019002215 | U1 * | 10/2020 | |
| EP | 2107192 | A2 * | 10/2009 | E05B 53/003 |
| FR | 2665499 | B1 * | 1/1994 | |
| JP | H09226372 | A | 9/1997 | |
| WO | 9201179 | A1 | 1/1992 | |

OTHER PUBLICATIONS

Written Opinion for International Application No. PCT/EP2022/066848, dated Nov. 29, 2022, 3 pages.

* cited by examiner

A-A

B-B

ACTIVE SEALING/LOCKING USING THE CONSTRICTION PRINCIPLE

CROSS-REFERENCE TO RELATED APPLICATIONS

This application is a 35 U.S.C. § 371 National Stage patent application of PCT/EP2022/066848, filed on 21 Jun. 2022, which claims the benefit of German patent application no. 20 2021 103 364.9, filed on 23 Jun. 2021, the disclosures of which are incorporated herein by reference in their entirety.

TECHNICAL FIELD

The present disclosure relates to a sealing system for an opening in a wall surface, which can be closed by means of a leaf, having

- a wall surface with an opening, which has an inner surface,
- a leaf adapted to the geometry of the opening in such a way that it can be inserted into the opening and close it, wherein a circumferential outer surface of the leaf is arranged facing the inner surface when the opening is in the closed state.

The term leaf is understood to mean in particular, but not exclusively, openable door or window leaves that close a corresponding opening in a wall surface.

The disclosure is suitable in particular for vehicles, especially local and long-distance public transport vehicles. Sealing the door or window leaf in such vehicles is important for a variety of reasons. On the one hand, leaks lead to increased and annoying noise, and on the other hand, they also lead to thermal or climatic problems inside the vehicle. In addition, a functioning seal also always fixes the leaf in place, meaning that stresses on the leaf and the associated components due to undesirable movements during the journey are avoided or at least reduced.

BACKGROUND

As a result of increasing demands for comfort, it is becoming ever more important to reduce the sound transmission of sliding doors, in particular in rail vehicles. The sliding door seal is also intended to reliably prevent the passage of air and liquids.

For local public transport vehicles, in particular rail vehicles, the necessary sealing is achieved, inter alia, by virtue of the fact that the entire door leaf is pressed or pulled against a door seal via motor power and held in this position. Inflatable door seals are also known to provide or improve sealing.

Seals are known that use spring force for better sealing. By way of example, DE 10 2014 217 343 A1 discloses a combination of an elastomeric seal with a metallic spring element. However, over time, the spring force can decrease and the seal can deteriorate. In addition, the sealing element has a relatively complicated structure and it is virtually impossible to achieve uniform sealing over the entire height of the door.

SUMMARY

The present disclosure thus provides a further option for a sealing system for an opening in a wall surface. In particular, the drawbacks of the prior art are to be avoided or at least reduced. The sealing system is intended to enable an opening in a wall surface to be closed flush with at least one leaf, for example a door or window leaf. The sealing system is preferably also intended for use in high-speed trains.

The advantage of the disclosure is achieved by providing a sealing system having the features of Claim 1. Accordingly, it has a sealing device, which is formed by

- a first sealing element, which is arranged in the inner surface of the opening and can be moved towards and away from the outer surface of the closed leaf,
- a drive element, which, when activated, drives the first sealing element in the opening plane of the opening towards the outer surface of the leaf into a sealing position and produces a force in the direction of the outer surface of the leaf such that when the opening is in the closed state, the first sealing element comes into sealing contact with the outer surface when acted upon by force.

The disclosure is in particular suitable for door leaves of vehicles, but is also suitable for window leaves, for example. The disclosure is described below for use with a door leaf in a local and long-distance public transport vehicle, but is not limited thereto.

In principle, the sealing system consists of an active and a passive element. The first sealing element is moveable and can be moved by the drive element against the passive element, for example a second sealing element, in a form-fitting or force-fitting manner. The first moveable sealing element is arranged on the inner surface of the opening and, in the closed state, is moved against the door leaf or the second sealing element arranged there.

In one particularly advantageous embodiment, a drive means is provided inside the first sealing element or between the sealing element and the inner surface of the opening, which drives the sealing element. In one advantageous embodiment, this drive element is formed by a tensioning element, for example a cable. When the door leaf is in the opening, the tensioning element is tensioned and drives the first sealing element against the second sealing element arranged on the door leaf, thus sealing the opening.

The sealing system can also be designed in such a way that individual sides can selectively seal, but advantageously a circumferential tensioning element is provided, which, as it were, constricts the door leaf in the closed position and thereby seals the opening. The tensioning element thus represents a kind of strap that is tightened when the door leaf is arranged in the opening and is to be sealed.

The tensioning element is preferably formed by a resistant cable, for example a steel or plastic cable, which is guided on the portal side between the first sealing element and the inner surface of the frame.

The drive element has a tensioning device, which tensions the tensioning element, the cable, when the opening is in the closed state. The drive element can, for example, be formed by a spindle on which the tensioning element is wound. Alternatively, a pulling device can be provided, which is firmly connected to the tensioning element and pulls it in such a way that the strap formed tightens around the door leaf.

The tensioning device can be provided at any position in the region of the opening, but it is best to position it directly adjacent, for example above the opening.

The pulling force that moves or pulls the tensioning element can be applied by an additional drive motor provided for this purpose, but in a particularly advantageous embodiment, the already existing door drive or a drive of another already existing system can also be used for this purpose.

The seal is in particular enlarged or improved by virtue of the fact that a second sealing element is provided on the outer surface of the door leaf, which interacts with the first moveable sealing element in a sealing manner. At least one of the two sealing elements is preferably made of a relatively soft, elastic or flexible material.

In one particularly advantageous embodiment, it can even be provided that the door leaf is not only sealed, but also locked via the sealing system. This can be easily and effectively achieved, for example, when using a form-fit connection. For example, one of the two sealing elements can have a groove running in the longitudinal direction of the sealing element, in which a section of the other sealing element designed as a tongue is arranged in the closed or sealed state. This produces a form fit in the opening direction and thus simple but effective locking of the door leaf in the opening.

The moveable first sealing element is moved back into the starting position in the released, non-tensioned state in such a way that it is possible to open or close the door leaf. The first sealing element can in particular also be actively moved.

In one particularly advantageous embodiment, a spring element is provided, which exerts a restoring force on the first sealing element towards the inner surface of the frame in such a way that the sealing and/or locking effect is cancelled.

BRIEF DESCRIPTION OF THE DRAWINGS

The disclosure is explained in more detail based on the following figures. The figures should only be understood as examples and are not intended to limit the disclosure to the exemplary embodiments shown. In particular, it should be pointed out once again that the explanation is only given by way of example using a door leaf or a door; all features can also be applied to two opening window leaves, for example. The figures are also only schematic diagrams, with not all aspects being to scale.

In the figures.

DETAILED DESCRIPTION OF THE DRAWINGS

Figure 1:
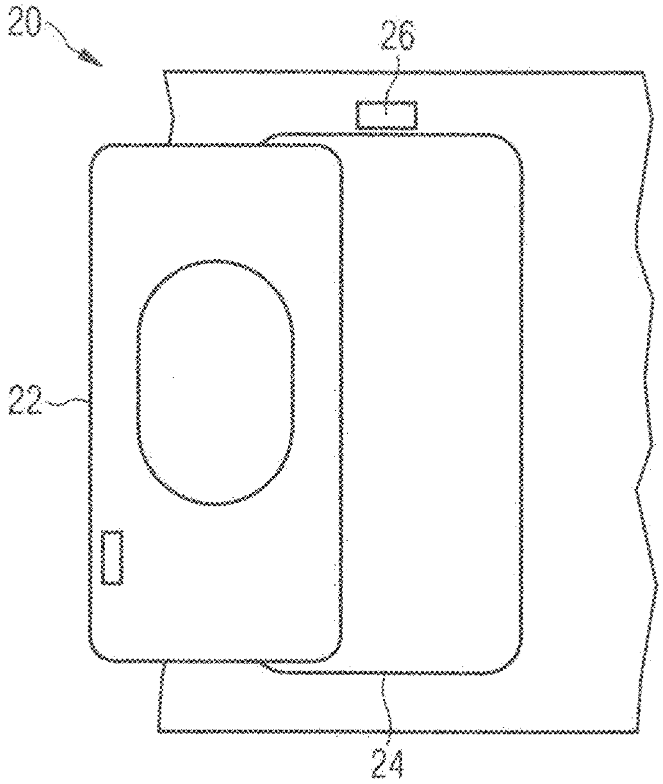
FIG. 1: shows a simplified schematic diagram of an open door leaf, which is not sealed or locked.

The figures show a sealing system 20 according to the disclosure by way of example. They show a leaf 22, in this case a door leaf arranged in an opening 24 of a wall surface 25. A drive element 26, designed as a tensioning device, is arranged above the opening or door opening 24.

The drive element 26 is connected to a tensioning element 28, designed as a steel cable or steel strip. The tensioning element 28 surrounds the door opening 24 in the manner of a strap. The drive element 26 is designed in such a way that it can contract the tensioning element 28, which reduces the size of the strap formed and constricts the door leaf 22, shown by the arrows in FIGS. 4 and 5.

The door leaf 22 is constricted by virtue of the fact that the tensioning element 28 moves a first moveable sealing element 30 towards an outer surface of the closed door leaf 22. For this purpose, in a particularly advantageous embodiment, the tensioning element 28 is arranged within the first sealing element 30, which in turn is moveably mounted in a guide profile 32 (cf. in particular FIGS. 3 and 5). In the exemplary embodiment shown, the first sealing element 30 has two components, one sealing means 34 that can be moved towards and away from the outer surface of the closed door leaf 22 and one retaining means 36 connected thereto and immovably fixed in the guide profile 32. The retaining means 36 is held in a groove 38 of the guide profile 32, the tensioning element 28 extends through the sealing means 34 parallel to an inner surface of the opening 24.

A restoring element 40 designed as a spring element is also shown. This is arranged within the first sealing element 30 between the sealing means 34 and the retaining means 36 and produces a force in the direction of the inner surface of the opening 24, i.e. in the opposite direction of the constricting force of the tensioning element 28. When the tensioning element 28 is released, the restoring element 40 causes the first sealing element 30 or the sealing means 34 to move away from the leaf 22, releasing it.

In principle, the restoring element 40 must be arranged between an inner surface running around the opening 24 and the moveable first sealing element 30 or the moveable sealing means 34. The proposed design of the first sealing element 30 with a retaining means 36 is not compulsory. The same applies to the tensioning element 28, which can also be designed differently than what has been described, adapted to the first sealing element 30. For example, it is conceivable that the entire first sealing element 30 is moveable and the tensioning element 28 extends between the first sealing element 30 and the inner surface of the opening 24.

Figure 2:
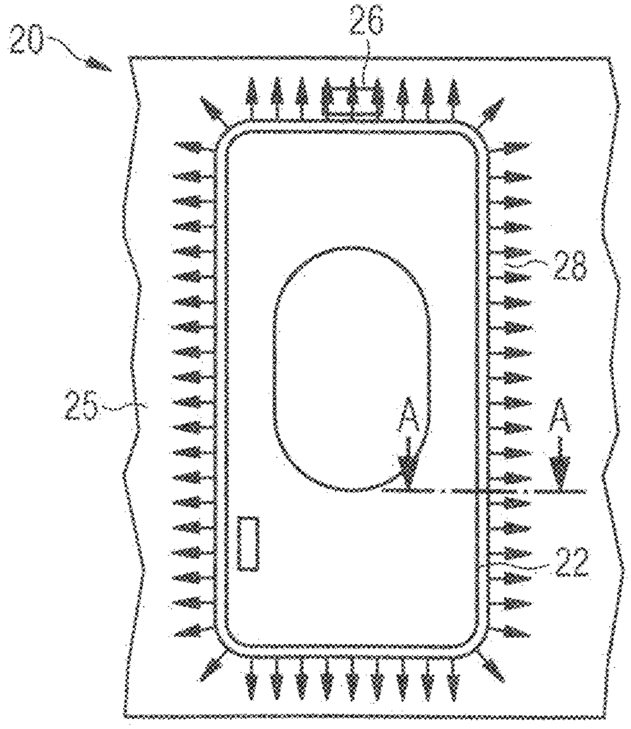
FIG. 2: shows a simplified schematic diagram of the closed door leaf, which is not sealed or locked.
Figure 4:
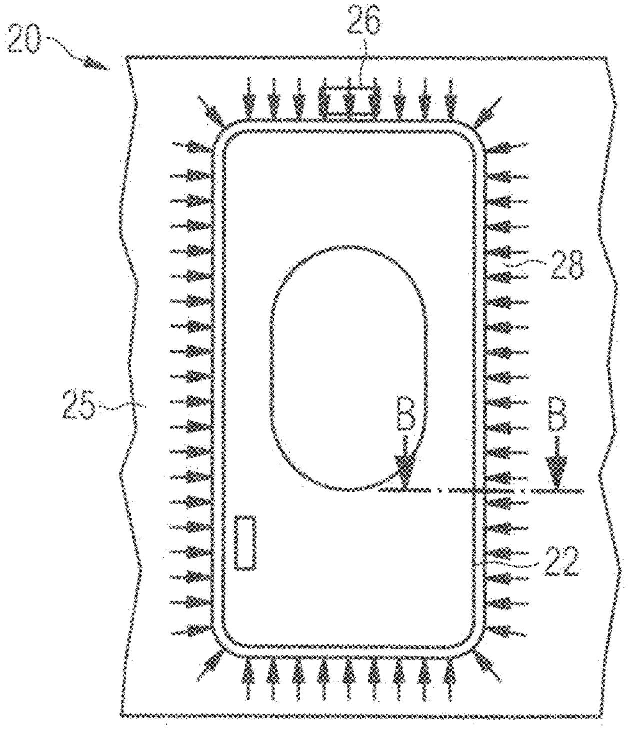

FIGS. 1, 2 and 4 show the arrangement of the drive element 26 above the opening 24. Alternatively, the drive element 26 can also be provided at a different point, but preferably outside the opening 24. The drive element 26 can be implemented by various means, for example by a spindle on which the tensioning element 28 is wound and unwound.

Figure 3:
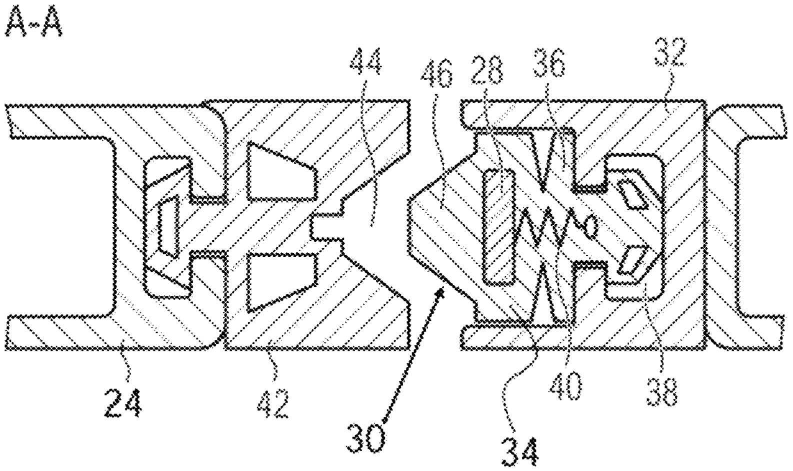
FIG. 3: shows a sectional view of the region A, A from FIG. 2, FIG. 4: shows a simplified schematic diagram of the closed door leaf, which is sealed or locked.
Figure 5:
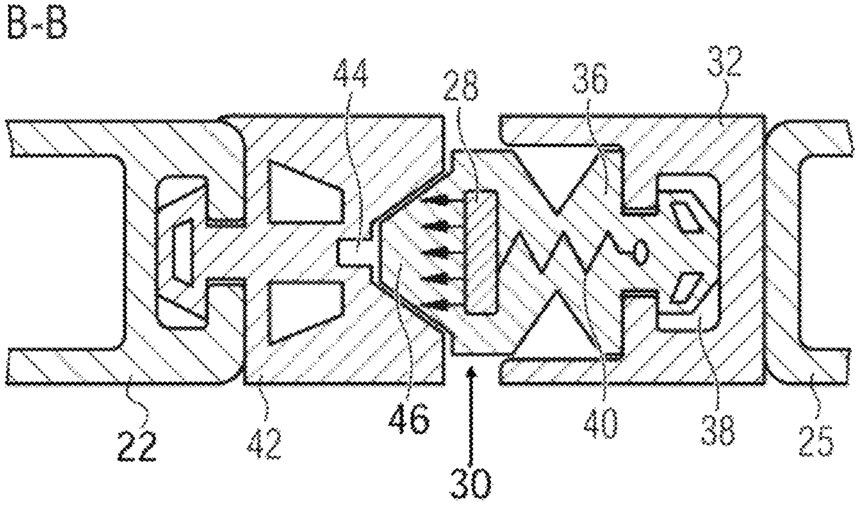
FIG. 5: shows a sectional view of the region B, B from FIG. 4.

FIGS. 3 and 5 show a second sealing element 42 arranged on an outer surface of the leaf 22. In the exemplary embodiment shown, the two sealing elements 30,42 that come into contact with each other are designed in such a way that the leaf 22 is held in a form-fitting manner in the constricted, closed state in the opening direction, i.e. transversely to the main extension plane of the opening 24. This is achieved by the fact that the second sealing element 42 has a receiving groove 44 for a projection 46 of the first sealing element 30. During the constriction process, the projection 46 moves into the receiving groove 44, thus coming into contact with the receiving groove 44 on three sides, with a front surface and two sides. This ensures an exceptionally good sealing effect.

In one particularly advantageous embodiment, the sealing system 20 is designed in such a way that it not only seals the leaf 22, but also locks it in the opening 24.

This can be achieved by virtue of the fact that the two sealing elements 30,42 are suitably resistant. This is the case here, whereby the two sealing elements 30, 42 not only seal the door system, but also at the same time lock the leaf 22 in the opening 24.

The disclosure is not limited to the exemplary embodiments shown, but also includes further variants of the disclosure.

The invention claimed is:

1. A sealing system for an opening in a wall surface, which can be closed by means of a leaf, the sealing system comprising:

the wall surface with the opening having a circumferential inner surface, the leaf adapted to the geometry of the opening in such a way that the leaf is configured to be inserted into the opening and close the opening, wherein a circumferential outer surface of the leaf is arranged facing the inner surface of the opening in a closed state, characterized in that a sealing device is provided, which is formed by a first sealing element, which is arranged in the inner surface of the opening and can be moved towards and away from the outer surface of the leaf in the closed state, a drive element, which, when activated, drives the first sealing element in an opening plane of the opening towards the outer surface of the leaf into a sealing position and produces a force in the direction of the outer surface of the leaf such that when the opening is in the closed state, the first sealing element comes into sealing contact with the outer surface when acted upon by the force, a circumferential tensioning element extending continuously around a periphery of the opening, wherein the circumferential tensioning element is configured, upon actuation, to uniformly constrict the leaf within the opening and thereby provide a circumferential sealing and/or locking effect.

2. The sealing system according to claim 1, wherein the drive element has a tensioning device that tensions the circumferential tensioning element when the opening is in the closed state and thereby pulls the first sealing element against the outer surface of the leaf.

3. The sealing system according to claim 2, wherein the circumferential tensioning element is arranged between the first sealing element and the inner surface of the opening.

4. The sealing system according to claim 2, wherein the circumferential tensioning element is designed to run around the opening and can be contracted via the drive element in such a way that the leaf is constricted in the opening.

5. The sealing system according to claim 1, wherein the first sealing element is formed by a moveable sealing means and a retaining means fixed to the inner surface of the opening, wherein the circumferential tensioning element is arranged within the sealing means.

6. The sealing system according to claim 1, wherein the leaf has a second sealing element on the outer surface, which interacts in a sealing manner with the first sealing element.

7. The sealing system according to claim 6, wherein the two sealing elements are configured such that in the closed state and when the two sealing elements are in contact with each other under the force, a form fit is achieved in an opening direction.

8. The sealing system according to claim 6, wherein one of the sealing elements has a groove, which interacts with a tongue of the other sealing element.

9. The sealing system according to claim 1, wherein the leaf is locked in the closed state of the opening by the application of the force by the first sealing element.

10. The sealing system according to claim 1, wherein a restoring element is provided, which exerts a restoring force on the first sealing element towards the inner surface of the opening such that the sealing and/or locking effect is cancelled.

11. The sealing system according to claim 1, wherein the leaf is held in the opening by a tension cable.

* * * * *